US012594632B2

(12) United States Patent
Bulgrin et al.

(10) Patent No.: US 12,594,632 B2
(45) Date of Patent: Apr. 7, 2026

(54) TECHNIQUES AND ASSEMBLIES FOR JOINING COMPONENTS USING SOLID RETAINER MATERIALS

(71) Applicant: Rolls-Royce Corporation, Indianapolis, IN (US)

(72) Inventors: Charles Alan Bulgrin, Indianapolis, IN (US); Matthew T. Kush, Indianapolis, IN (US); Rusty M. Garner, Indianapolis, IN (US); Carl R. Russo, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 175 days.

(21) Appl. No.: 18/159,400

(22) Filed: Jan. 25, 2023

(65) Prior Publication Data

US 2023/0158612 A1 May 25, 2023

Related U.S. Application Data

(62) Division of application No. 16/685,265, filed on Nov. 15, 2019, now Pat. No. 11,565,352.

(51) Int. Cl.
B23K 35/02 (2006.01)
B23K 1/00 (2006.01)
(Continued)

(52) U.S. Cl.
CPC ........ B23K 35/0294 (2013.01); B23K 1/0018 (2013.01); B23K 35/0244 (2013.01);
(Continued)

(58) Field of Classification Search
None
See application file for complete search history.

(56) References Cited

U.S. PATENT DOCUMENTS 4,063,939 A   12/1977  Weaver et al.
5,332,360 A    7/1994  Correia et al.
(Continued)

FOREIGN PATENT DOCUMENTS

EP        1199488 A2    4/2002
EP        2286953 B1   11/2011
(Continued)

OTHER PUBLICATIONS

Adames, Characterization of Polymeric Binders for Metal Injection Molding (MIM) Process, Dec. 2007, 237 pgs.
(Continued)

*Primary Examiner* — Kim S. Horger
(74) *Attorney, Agent, or Firm* — Shumaker & Sieffert, P.A.

(57) ABSTRACT

The disclosure describes example techniques and assemblies for joining a first component and a second component. The techniques may include positioning the first and second component adjacent to each other to define a joint region between adjacent portions of the first component and the second component. The techniques may also include inserting a solid retainer material into the joint region through an aperture in one of the first component or the second component to form a mechanical interlock between the first component and the second component and sealing the aperture to retain the solid retainer material within the joint region. The solid retainer material includes at least one of a metal, a metal alloy, or a ceramic.

19 Claims, 11 Drawing Sheets

(51) Int. Cl.

| | | |
|---|---|---|
| *B23K 35/30* | (2006.01) | |
| *B23K 101/00* | (2006.01) | |
| *B23K 103/00* | (2006.01) | |

(52) U.S. Cl.

CPC ...... *B23K 35/3033* (2013.01); *B23K 35/3046* (2013.01); *B23K 35/3053* (2013.01); *B23K 2101/001* (2018.08); *B23K 2103/52* (2018.08); *Y10T 403/7075* (2015.01)

(56) References Cited

U.S. PATENT DOCUMENTS

| | | | |
|---|---|---|---|
| 5,797,725 | A | 8/1998 | Rhodes |
| 6,553,667 | B1 | 4/2003 | West |
| 8,128,373 | B2 | 3/2012 | Webb |
| 10,767,496 | B2 * | 9/2020 | Freeman ............... F01D 11/008 |
| 12,036,627 | B2 * | 7/2024 | Bulgrin ................... B23K 1/19 |
| 2009/0196761 | A1 | 8/2009 | James |
| 2013/0068582 | A1 | 3/2013 | Kim et al. |
| 2014/0301849 | A1 | 10/2014 | Snyder |
| 2015/0023796 | A1 | 1/2015 | Barber |
| 2015/0196118 | A1 | 7/2015 | Derelov |
| 2015/0375322 | A1 | 12/2015 | Salm et al. |
| 2016/0339544 | A1 * | 11/2016 | Xu ............................ B22F 7/08 |
| 2018/0058148 | A1 | 3/2018 | Zhang et al. |
| 2018/0304371 | A1 | 10/2018 | Wiebe et al. |
| 2018/0304418 | A1 | 10/2018 | Wiebe et al. |
| 2018/0355736 | A1 * | 12/2018 | Engel ................... F01D 5/3053 |
| 2019/0275617 | A1 | 9/2019 | Bulgrin et al. |
| 2019/0323534 | A1 | 10/2019 | Derelov |
| 2021/0146485 | A1 | 5/2021 | Bulgrin et al. |
| 2021/0180630 | A1 | 6/2021 | Bruno et al. |
| 2021/0387257 | A1 | 12/2021 | Shuck et al. |
| 2021/0402480 | A1 | 12/2021 | Sweetland |

FOREIGN PATENT DOCUMENTS

| | | |
|---|---|---|
| EP | 3293354 A1 | 3/2018 |
| EP | 3536433 A1 | 9/2019 |
| WO | 2017074372 A1 | 5/2017 |

OTHER PUBLICATIONS

Clark, "Experimental Liquid Metal Slip Ring Project", Jun. 22, 1970, Retrieved from https://ntrs.nasa.gov/search.jsp?R= 19700032859, 100 pgs.

Extended Search Report from counterpart European Application No. 20202470.9, dated Apr. 1, 2021, 7 pp.

Loctite, Retaining Compound Design Guide—Securing Cylindrical Assemblies, Retrieved on Sep. 11, 2019 from www.loctiteretaining. com, 20 pgs.

Prosecution History from U.S. Appl. No. 16/685,265, dated Apr. 8, 2022 through Sep. 28, 2022, 31 pp.

Communication pursuant to Article 94(3) EPC from counterpart European Application No. 20202470.9 dated Aug. 3, 2023, 5 pp.

Response to Communication pursuant to Article 94(3) EPC dated Aug. 3, 2023, from counterpart European Application No. 20202470.9 filed Dec. 4, 2023, 60 pp.

\* cited by examiner

110

FORM OPENING AND JOINT SURFACE OF FIRST
COMPONENT AND SECOND COMPONENT

112

POSITION FIRST COMPONENT AND SECOND
COMPONENT ADJACENT TO EACH OTHER TO
DEFINE JOINT REGION

114

INSERT SOLID RETAINER MATERIAL INTO JOINT
REGION THROUGH OPENING TO FORM
MECHANICAL INTERLOCK

116

SEAL OPENING TO RETAIN SOLID RETAINER
MATERIAL WITHIN JOINT REGION

TECHNIQUES AND ASSEMBLIES FOR JOINING COMPONENTS USING SOLID RETAINER MATERIALS

This application is a divisional filing of U.S. patent application Ser. No. 16/685,265, filed 15 Nov. 2019, the entire contents of which are incorporated herein by reference.

TECHNICAL FIELD

The present disclosure generally relates to techniques and assemblies for joining components.

BACKGROUND

Casting may be used to form metal or alloy components. However, casting relatively large articles or articles having a relatively complex geometry in a single operation may result in deviation of the cast article from specifications or tolerance. Instead of casting or otherwise forming large or complex articles as a single piece or component, such articles may be cast or otherwise fabricated in the form of separate components, which may be joined to form an assembly. For example, the separate components may be arranged at specific relative positions and bonded through thermal processes, such as welding, to form the assembly.

SUMMARY

The disclosure describes example assemblies and techniques for joining a first component to a second component at a low temperature using a solid retainer material that forms a mechanical interlock.

In some examples, the disclosure describes an example technique including positioning a first component and a second component adjacent to each other to define a joint region between adjacent portions of the first component and the second components. The example technique further includes inserting a solid retainer material into the joint region through an opening in one of the first component or the second component to form a mechanical interlock between the first component and the second component. The solid retainer material includes at least one of a metal, a metal alloy, or a ceramic. The example technique includes sealing the opening to retain the solid retainer material within the joint region. In some examples, the solid retainer material includes a plurality of solid retainer modules. In some examples, the example technique includes inserting a binder into the joint region through the opening and solidifying the binder to form a composite mechanical interlock between the first component and the second component.

In some examples, the disclosure describes an example assembly including a first component, a second component, and a mechanical interlock. The first and second components are positioned adjacent to each other to define a joint region between adjacent portions of the first component and the second component. The mechanical interlock includes a solid retainer material disposed in the joint region. The solid retainer material includes at least one of a metal, a metal alloy, or a ceramic. In some examples, the solid retainer material includes a plurality of solid retainer modules. In some examples, the mechanical interlock includes a binder around the solid retainer material to form a composite mechanical interlock.

The details of one or more examples are set forth in the accompanying drawings and the description below. Other features, objects, and advantages will be apparent from the description and drawings, and from the claims.

DETAILED DESCRIPTION

Figure 1A:
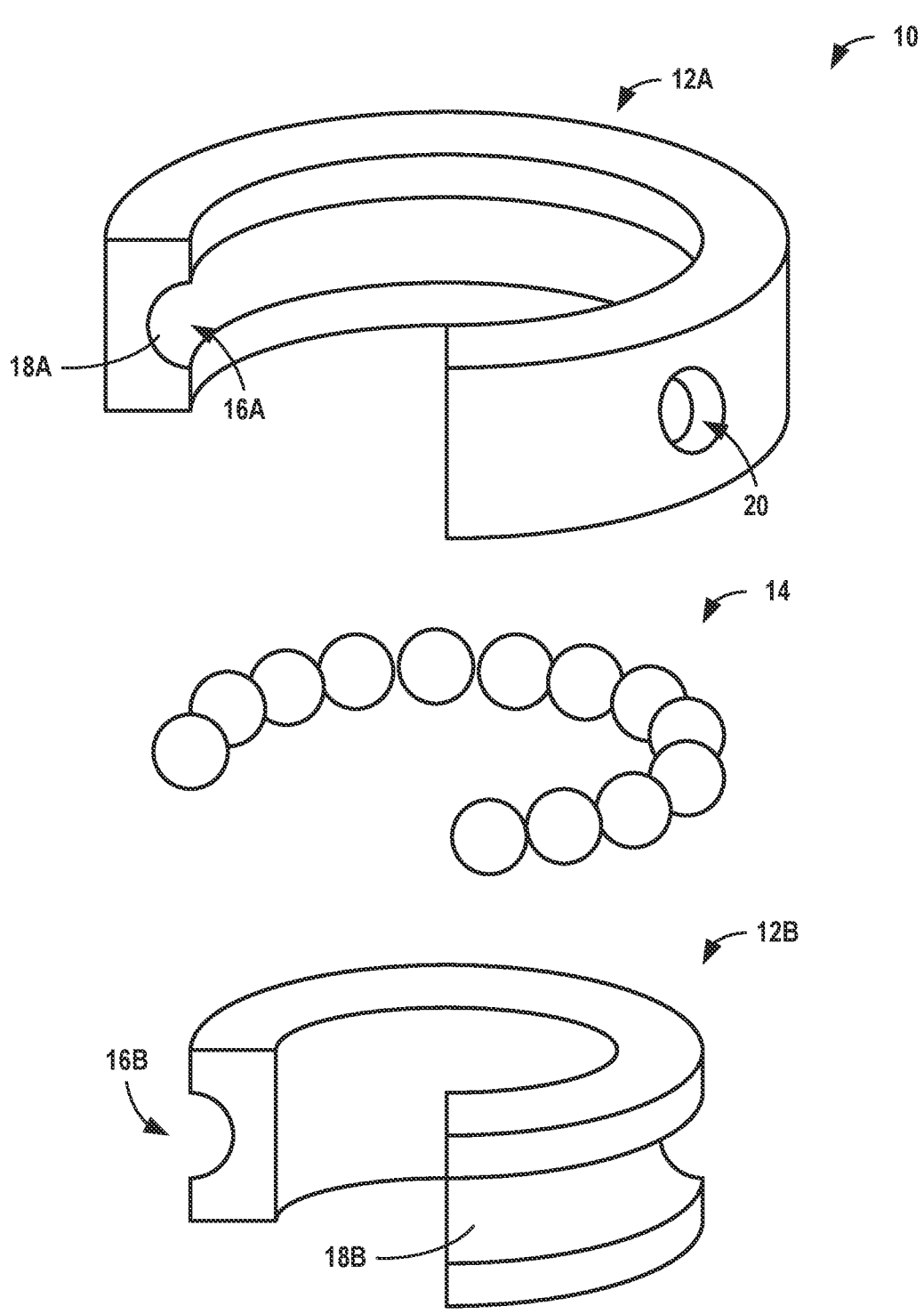
FIG. 1A is a conceptual and schematic diagram illustrating an exploded view of an example assembly for joining a first component and a second component by using a plurality of solid retainer modules to form a mechanical interlock.

The disclosure describes example assemblies and techniques for joining a first component to a second component at a low temperature using a solid retainer material that forms a mechanical interlock. A mechanical interlock may be an interlock that has a mechanism that is primarily mechanical (e.g., not adhesive or chemical). A solid retainer material may be a retainer material that does not undergo a bulk melting process (e.g., a thermal process in which a bulk of the retainer material is raised to or above a melting temperature) after insertion of the retainer material into the joint region. The first component and the second component define a joint region, such as adjacent channels or other inset structures. The solid retainer material is inserted and sealed into the joint region as either a preformed structure or subsequently formed structure to form a mechanical interlock in the joint region, thereby restraining the first component relative to the second component. For example, the mechanical interlock may extend at least partially into a channel of each of the first and second components, such that the first component and the second component at least partially surround the mechanical interlock. The first or second components may include components benefitting from a close fitting (relatively low leakage) structural connection in high-temperature operating conditions, such as components of a gas turbine engine, for example, a high-pressure nozzle guide vane and shroud.

While techniques such as bi-casting may be used to produce an integrally formed metallic joint to structurally connect components, bi-casting may require a casting foundry including, for example, separate furnace preheat and liquid metal pouring operations with elaborate tooling, as well as close monitor and control during various stages of the process. To integrally form a bi-cast joint, a molten metal or alloy may be heated to a temperature at or above the melting point of components being joined. Moreover, any significant leakage of molten metal or alloy during the bi-casting process may affect the integrity of components being joined or of surrounding furnace tooling, which may be costly and difficult to replace. As an alternative to joining bi-cast components using the metal or alloy of the components, a different metal may be melted and flowed between the components to join the components. This molten metal may have a lower melting point than the components to be joined, but may still expose the components to high temperatures that may cause microstructural changes in the components. Additionally, the molten metal may have less advantageous mechanical properties, such as sheer strength, than metals or alloys having higher melting point temperatures. Regardless of whether a same or different molten metal or alloy is used to join the components, such molten metal or alloy may be difficult to apply and may require large equipment that may be expensive or difficult to position at a particular location, requiring disassembly of the components from a corresponding machine prior to joining the components.

In contrast, example techniques and assemblies according to the disclosure may incorporate high strength materials using lower temperatures that are below the melting temperatures of the high strength materials. For example, the solid retainer material forming the mechanical interlock may be a material, such as a superalloy or a ceramic, that has a higher strength than a material that has been melted and solidified within a joint region to form a mechanical interlock. As another example, both a mechanical interlock formed from the solid retainer material and the components that are secured by the mechanical interlock may be exposed to lower temperatures than a mechanical interlock formed by melting and solidifying the retainer material in the joint region. As another example, the solid retainer material may form a composite mechanical interlock with other materials, such as braze materials, that may melt and solidify around the solid retainer material to seal a joint while providing better mechanical properties, such as higher sheer strength, than the solidified braze materials alone.

In some instances, example techniques and assemblies according to the disclosure may form a mechanical interlock that incorporates preformed structures. For example, the retainer material may be formed into solid retainer modules having microstructural properties that may remain substantially unchanged between formation of the solid retainer modules and incorporation into a joint region as a mechanical interlock. As another example, the solid retainer modules may include various macrostructural properties, such as shape and size, that may not be achieved with a monolithic mechanical interlock formed in the joint region, such as through melting a retainer material or incorporating a retainer powder in a melted carrier material.

In some instances, example techniques and assemblies according to the disclosure may form a mechanical interlock without the use of any molten metals or alloys. For example, the solid retainer material may form a mechanical interlock in the joint region without melting the solid retainer material, thus eliminating large and/or power intensive equipment for melting metals or alloys prior to insertion into the joint region or while contained in the joint region. As a result, components may be secured less expensively, in the field, and/or without requiring disassembly of the components prior to forming a joint between the components.

In some examples, a mechanical interlock securing two or more components may be formed from a solid retainer material without exposing the components to molten metals, alloys, or ceramics. FIG. 1A is a conceptual and schematic diagram illustrating an exploded view of an example assembly 10 for joining a first component 12A and a second component 12B by inserting and securing a solid retainer material in a joint region to form a mechanical interlock 14. In some examples, first and second components 12A and 12B (also referred to as "components 12A and 12B") may be joined to form an article or a portion of an article that is part of a high temperature mechanical system. For example, components 12A and 12B may be joined to form an article or a portion of a nozzle guide vane (NGV) that is used in a high pressure or intermediate pressure stage in a gas turbine engine. In other examples, the article may include another component of a high temperature mechanical system, such as another component of a gas turbine engine. For example, the article may include a gas turbine engine blade alone or with a blade shroud, gas turbine engine vane, blade track, combustor liner, spar, or the like.

Each of components 12A and 12B may include a metal, an alloy, or a ceramic-based material, such as a ceramic matrix composite (CMC). In some examples, components 12A and 12B include substantially the same (e.g., the same or nearly the same) metal or alloy, while in other examples, components 12A and 12B include different metals or alloys. Although FIG. 1A illustrates components 12A and 12B as each defining a simple, substantially curvilinear geometry, in other examples, one or both of first or second components 12A or 12B may define a more complex geometry, including simple or complex curves, overhangs, undercuts, internal cavities, or the like. For example, components 12B may be a vane having multiple different curvatures.

In some examples, one or both of components 12A and 12B may include a Ni-, Co-, or Fe-based superalloy, or the like. The superalloy may include other additive elements to alter its mechanical and chemical properties, such as toughness, hardness, temperature stability, corrosion resistance, oxidation resistance, and the like. Any useful superalloy may be utilized in first or second components 12A or 12B, including, for example, Ni-based alloys available from Martin-Marietta Corp., Bethesda, MD, under the trade designation MAR-M246, MAR-M247; Ni-based alloys available from Cannon-Muskegon Corp., Muskegon, MI, under the trade designations CMSX-3, CMSX-4, CMSX-10, and CM-186; Co-based alloys available from Martin-Marietta Corp., Bethesda, MD, under the trade designation MAR-M509; Fe-based alloys; and the like. One or both of components 12A and 12B may be made using at least one of casting, forging, powder metallurgy, molding, or additive manufacturing. In some examples, components 12A and 12B are made using the same process, while in other examples, components 12A and 12B are made using different processes.

In some examples, one or both of components 12A or 12B may include a ceramic or ceramic matrix composite (CMC). The ceramic or CMC may include any useful ceramic material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. The binder or filler material may include any useful binder or filler including, for example, silicon metal for silicon-based CMC materials, silicon metal with silicon carbide (SiC) reinforcing particles for silicon-based CMC materials, aluminum oxide ($Al_2O_3$) particles in water/solvent carrier for alumina-based CMC materials, and the like. As another example, the filler material may include a continuous monofilament or multifilament weave. In some examples, the CMC may include a SiC/SiC CMC, or an oxide/oxide CMC. For example, a SiC/SiC or oxide/oxide CMC component may be joined to a metal or alloy component or another SiC/SiC or oxide/oxide CMC component.

First component 12A defines at least one joining region 16A defining a joint surface 18A. Similarly, second component 12B defines at least one joining region 16B defining a joint surface 18B. In some examples, first and second joint surfaces 18A and 18B (also referred to as "joint surfaces 18A and 18B") may define complementary shapes. FIG. 1A illustrates joint surfaces 18A and 18B as defining substantially simple curved surfaces. In other examples, joint surfaces 18A and 18B may define other, simpler shapes, such as flat shapes, or more complex shapes, such as complex curves, overhangs, undercuts, apertures, annuluses, or the like. In some instances, each of joint surfaces 18A and 18B may include an inset that extends beyond a respective inner plane of component 12A or outer plane of component 12B.

Components 12A and 12B are positionable such that joining regions 16A and 16B are adjacent to each other and define a joint region (not shown in FIG. 1A). The joint region may include any kind of simple or complex joint, including, for example, at least one of a bridle joint, a butt joint, a miter joint, a dado joint, a groove joint, a tongue and groove joint, a mortise and tenon joint, a birdsmouth joint, a halved joint, a biscuit joint, a lap joint, a double lap joint, a dovetail joint, or a splice joint. Consequently, joining regions 16A and 16B may have any corresponding geometries to define the surfaces of the joint region. For example, for a mortise and tenon joint, first component 12A may define a mortise (a cavity) and second component 12B may define a tenon (a projection that inserts into the mortise). As another example, for a splice joint, first component 12A may define a half lap, a bevel lap, or the like, and second component 12B may define a complementary half lap bevel lap, or the like.

In some examples, although not shown in FIG. 1A, assembly 10 may include a clamp, press, or other mechanism for exerting pressure between joining regions 16A and 16B during joining. The pressure between joining regions 16A and 16B may facilitate formation of the joint, e.g., by helping to at least one of maintain a gap at the joint region, to promote flow or migration of a solid retainer material of mechanical interlock 14 or a binder around the solid retainer material of mechanical interlock 14, and to evacuate any gases or porosity in the solid retainer material or the binder, which may reduce porosity in the joint.

Figure 1B:
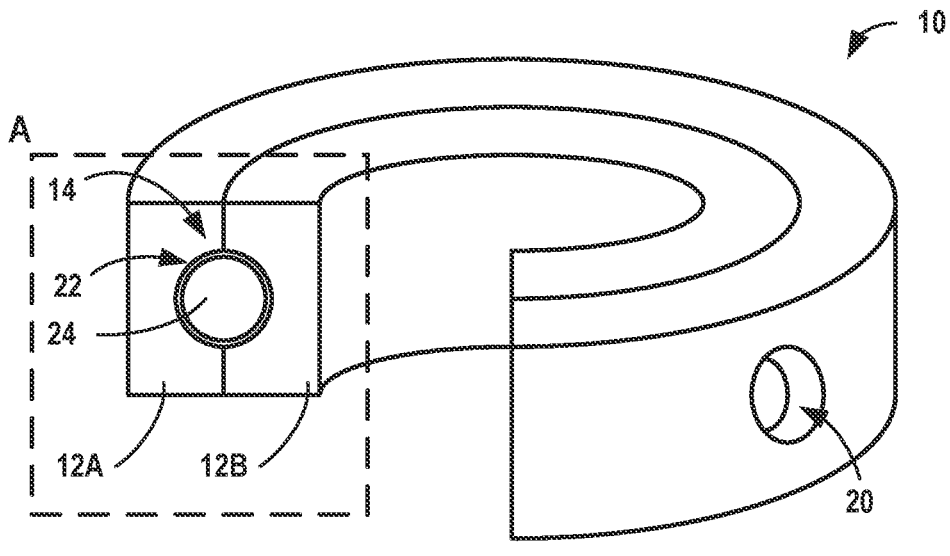
FIG. 1B is a conceptual and schematic diagram illustrating a partial view of an example system including the assembly of FIG. 1A.

FIG. 1B is a conceptual and schematic diagram illustrating a partial view of an example system including the assembly of FIG. 1A. Assembly 10 may be assembled as shown in FIG. 1B, with mechanical interlock 14 disposed in a joint region 22 defined by joint surfaces 18A and 18B of joining regions 16A and 16B. While a single joint region 22 is shown in the example assembly of FIG. 1B, in other examples, components 12A and 12B may define a plurality of respective joint regions, and a solid retainer material may be introduced into respective joint regions of the plurality of joint regions to form mechanical interlock 14. In some examples, different compositions of the solid retainer material may be introduced into different joint regions, or in different portions of the same joint region.

Mechanical interlock 14 may include a solid retainer material. The solid retainer material may include any solid material, such as a module or powder, that may form mechanical interlock 14 as discussed herein. The solid retainer material may be selected to provide sufficient strength and rigidity to mechanical interlock 14 to secure first component 12A to second component 12B or restrain first component 12A relative to second component 12B. Mechanical interlock 14 may be formed from any suitable metal, alloy, or ceramic for the particular joint conditions.

In some examples, the solid retainer material is a superalloy having a high mechanical strength. For example, mechanical interlock 14 may experience high sheer forces created between component 12A and component 12B, such that a superalloy having a high sheer strength at elevated temperatures may be used to ensure sufficient strength to join components 12A and 12B. Example superalloys that may be used may include, but are not limited to, Ni-based superalloys, Co-based superalloys, Fe-based superalloys, and the like. In some examples, the solid retainer material may have a sheer strength greater than about 20,000 pounds per square inch (psi) at room temperature, such as greater than about 50,000 psi. For example, MarM Ni-based superalloy has a shear strength at room temperature of about 64,000 psi and a shear strength at 900 F of about 62,000 psi. In some examples, the solid retainer material includes a metal or alloy that melts at a temperature of greater than about 1315° C. (about 2400° F.). In some examples, the solid retainer material may include a metal or alloy substantially similar to or substantially the same as (e.g., the same or nearly the same) the alloy in first component 12A, second component 12B, or both.

In some examples, the solid retainer material is a ceramic-based material having high stability at high temperatures. For example, mechanical interlock 14 may experience high temperatures in a gas turbine engine environment, such that a ceramic-based material having high stability may be used to ensure sufficient strength at high temperatures to join component 12A and 12B. Example ceramic-based materials that may be used include, but are not limited to, transition metal borides, carbides, nitrides, oxides, and the like.

Figure 1C:
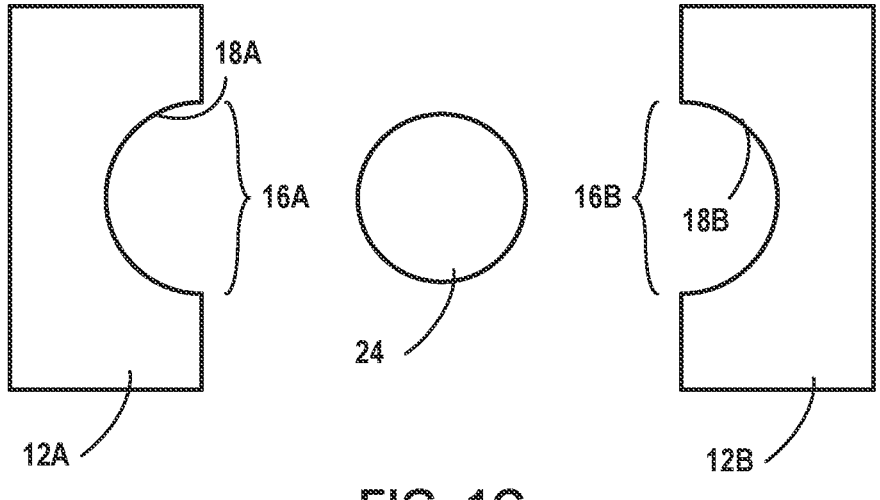
FIG. 1C is a conceptual and schematic diagram illustrating a partial sectional and exploded view of region A of the system of FIG. 1B.

In the example of FIGS. 1A-1C, mechanical interlock 14 includes a plurality of solid retainer modules 24. Each solid retainer module 24 may be configured to fit through opening 20 into joint region 22 and, individually as solid retainer module 24 or collectively as the plurality of solid retainer modules 24, secure or restrain first component 12A to second component 12B. In some examples, each of the plurality of solid retainer modules 24 may have a predetermined shape. The predetermined shape may correspond to a portion, such as one or both of joint surfaces 18A or 18B, of a shape of joint region 22. As described above, joint region 22 may include a relatively simple geometry as shown in FIG. 1A, or may include a more complex geometry, e.g., multiple planes or surfaces, complex curves, overhangs, undercuts, internal cavities, or the like. Accordingly, solid retainer modules 24 may be cut, machined, or formed into a relatively simple shape, or a more complex, e.g., including curvature, angles, apertures, or the like to form mechanical interlock 14. Regardless of the complexity of the shape of mechanical interlock 14 and depending upon the geometry of joint region 22, solid retainer modules 24 may include a substantially two-dimensional shape (e.g., a plane) or a three-dimensional shape (e.g., including curvature, planes at angles with respect to one another, and the like).

The plurality of solid retainer modules 24 may have a variety of sizes and shapes. In some examples, each solid retainer module 24 may be sized to permit placement of the solid retainer module 24 in joint region 22 with a small clearance to permit movement of each solid retainer module 24 through joint region 22. For example, dimensions of a geometry (e.g., a diameter, length, width, height, etc.) of each solid retainer module 24 may be slightly smaller than dimensions of a geometry of joint region 22, such that the plurality of solid retainer modules 24 may be inserted through opening 20 (or multiple openings) and positioned in joint region 22. In some examples, the plurality of solid retainer modules 24 may have a diameter greater than about one millimeter and/or less than about 95% of a diameter of joint region 22, such as about 2.5 millimeters. In some instances, a diameter of the plurality of solid retainer modules 24 may be dependent on a geometry of joint region 22. For example, a smallest dimension of joint region 22 may restrict a size of the plurality of retainer modules, such that nonuniformities of joint region 22 or an asymmetrical shape of the plurality of solid retainer modules 24 may limit an ability of the plurality of solid retainer modules 24 to move within joint region 22. While shown as a same size, in some instances, the plurality of solid retainer modules may include two or more different sizes. For example, a first plurality of solid retainer modules may have a first size corresponding to a dimension of joint region 22, while a second plurality of solid retainer modules may have a second size corresponding to gaps between adjacent solid retainer modules of the first plurality of solid retainer modules, such that a volume of joint region 22 may be include large solid retainer modules while being more fully filled with solid retainer material than large solid retainer modules alone. Shapes that may be used for solid retainer modules 24 may include, but are not limited to, spheres, cylinders, barrel-shapes, ovular spheres, blocks, cones, and the like. Various shapes and sizes of solid retainer modules 24 may be discussed further in FIGS. 3A-3C below.

In the example of FIGS. 1A-1C, the solid retainer material of mechanical interlock 14 is not bulk heated above a melting temperature of the solid retainer material to form mechanical interlock 14. For example, unlike assemblies with mechanical interlocks formed from melted metals or alloys contained within a joint region, the solid retainer material of mechanical interlock 14 does not melt during formation of mechanical interlock 14. As such, mechanical interlock 14 may include a solid retainer material that has substantially the same microstructure as the solid retainer material prior to insertion into joint region 22. By utilizing mechanical interlock 14 having a solid retainer material, metals, alloys, and ceramics with desirable mechanical and chemical properties (e.g., high temperature oxidation resistance) may be utilized in a joining technique to join first component 12A and second component 12B.

FIG. 1C is a conceptual and schematic diagram illustrating a partial sectional and exploded view of region A of the system of FIG. 1B. A joint surface may be defined by joint region 22, for example, a surface of one or both of first or second joining regions 16A or 16B. Mechanical interlock 14 secures first component 12A to second component 12B or restrains first component 12A relative to second component 12B. For example, the shape and geometry of mechanical interlock 14 (for example, substantially conforming to a portion or dimension of joint region 22, such as joint surfaces 18A and/or 18B) may mechanically lock or secure a portion of first component 12A relative to a respective portion of second component 12B. For example, first component 12A and second component 12B may be limited in movement in at least one direction. In some examples, the plurality of solid retainer modules 24 may at least partially surround at least one of first component 12A or second component 12B. For example, mechanical interlock 14 may surround a perimeter subtending an angle greater than 180°, or greater than 210°, or greater than 240°, or greater than 270°, or greater than 300°, or substantially 360° (for example, within 1°, 5°, or 10° of 360°) about a central axis defined respectively by first component 12A or second component 12B. In some examples, mechanical interlock 14 may form a segmented ring, or a segmented sleeve, surrounding one or both of components 12A or 12B. In some examples, the mechanical interlock may be exterior to an exterior surface defined by one of components 12A or 12B, and interior to an interior surface defined by the other of components 12A or 12B. For example, in the examples shown in FIGS. 1A-1C, the solid retainer material (and mechanical interlock 14 formed from the solid retainer material) surrounds and is exterior to (radially outward of) second component 12B, while being interior to (radially inward of) first component 12A. However, any suitable configuration of mechanical interlock 14 relative to components 12A and 12B that secures components 12A and 12B together may be used.

Mechanical interlock 14 ultimately formed from the plurality of solid retainer modules 24 may possess sufficient mechanical strength and high temperature oxidation resistance to be utilized in a high temperature mechanical system, such as a nozzle guide vane in a gas turbine engine.

Figure 2A:
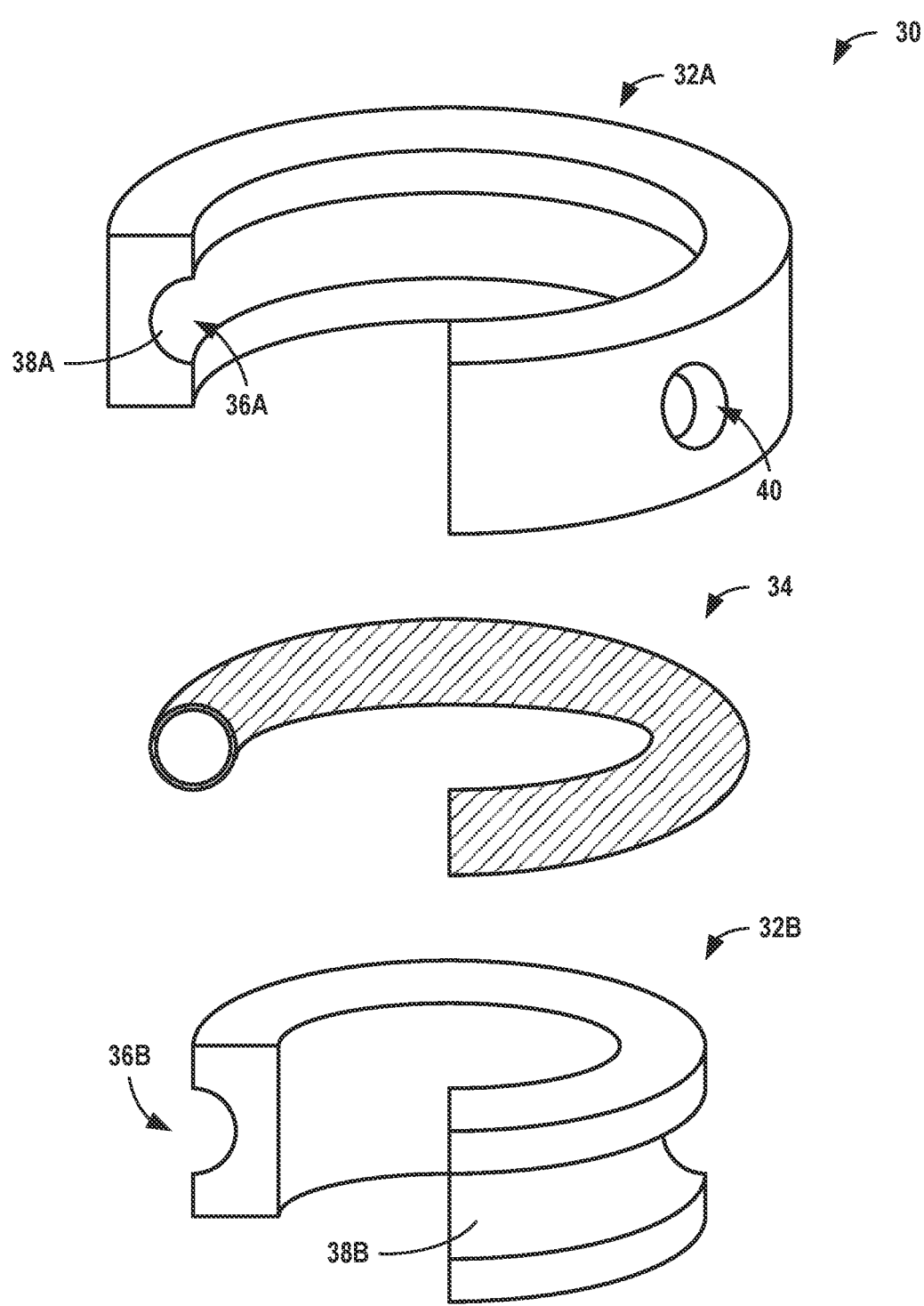
FIG. 2A is a conceptual and schematic diagram illustrating an exploded view of an example assembly for joining a first component and a second component by using a plurality of solid retainer modules and a binder to form a composite mechanical interlock.

In some examples, a composite mechanical interlock securing two or more components may be formed a solid retainer material and one or more binder materials without melting the solid retainer material. FIG. 2A is a conceptual and schematic diagram illustrating an exploded view of an example assembly 30 for joining a first component 32A and a second component 32B by inserting a solid retainer material and a binder to form a composite mechanical interlock 34. Unless otherwise specified, first component 32A, second component 32B, a first joining region 36A, a second joining region 36B, a first joint surface 38A, a second joint surface 38B, and a opening 40 may correspond to first component 12A, second component 12B, first joining region 16A, second joining region 16B, first joint surface 18A, second joint surface 18B, and opening 20 of FIGS. 1A-1C.

Figure 2B:
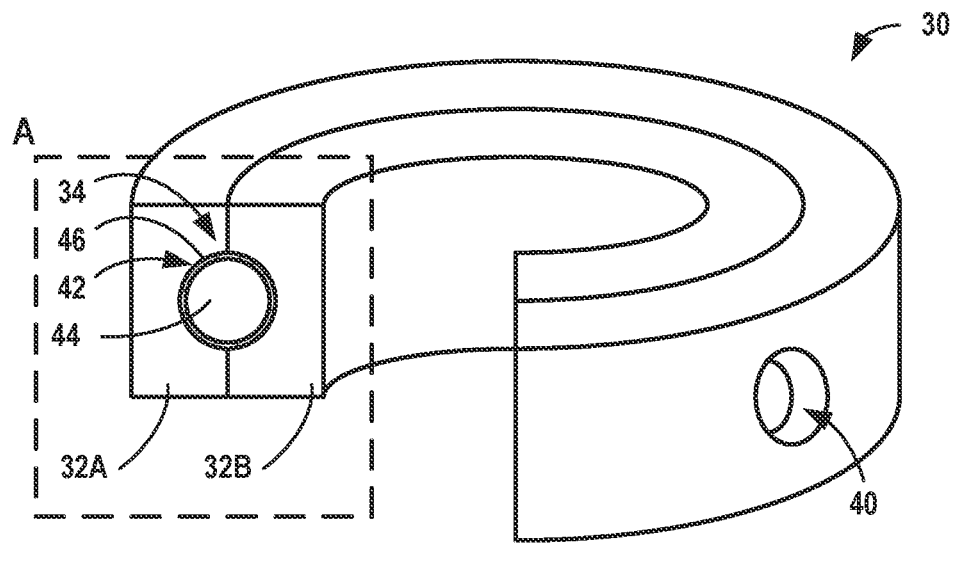
FIG. 2B is a conceptual and schematic diagram illustrating a partial view of an example system including the assembly of FIG. 2A.

FIG. 2B is a conceptual and schematic diagram illustrating a partial view of an example system including the assembly of FIG. 2A. Composite mechanical interlock 34 includes a plurality of solid retainer modules 44 and a binder 46. The plurality of solid retainer modules 44 may correspond to (e.g., have similar compositions, microstructural properties, and/or macrostructural properties as) the solid retainer modules 24 of FIGS. 1A-1C. Composite mechanical interlock 34 may have a shape that at least partially conforms to joint region 42.

Binder 46 may include one or more of a putty or a paste. In some examples, binder 46 includes a braze material. In some examples, the braze material may include a Ni-based or Co-based wide gap braze alloy. The braze material may include greater amounts of alloying elements that some other braze materials used in braze foils, which may contribute to improved mechanical properties, chemical properties, or both compared to some other braze materials used in braze foils. For example, the braze material may possess sufficient mechanical strength and high temperature oxidation resistance to be used in a nozzle guide vane in a gas turbine engine.

In some examples, the braze material may include both a braze alloy powder (a low-melt powder composition) and a superalloy powder (a high-melt powder composition). The low-melt alloy powder composition is an alloy, or a mixture of alloys, that substantially melts below a braze or joining temperature (hence the name "low-melt" or "braze powder"). In contrast, the high-melt alloy powder composition is an alloy, or a mixture of alloys, that remains substantially unmelted at the braze temperature, because the composition has a melting temperature above the braze temperature (hence the name "high-melt" or "superalloy powder"). In some implementations, the braze alloy powder and the superalloy powder may have specific powder mesh sizes, and may be produced by induction melting the braze alloy or the superalloy powder, respectively, in vacuum or an argon atmosphere, followed by argon gas atomization. Each individual powder component used in the braze material may be analyzed to confirm the particle size and chemical compositions.

In some examples, the low-melt powder composition includes an alloy or a mixture of alloys that melt at a temperature below about 1260° C. (about 2300° F.). In some examples the low-melt alloy powder comprises a mixture of two or more low-melt alloys. In some examples, the high-melt alloy powder composition may include a single high-melt alloy or a mixture of alloys that melts at a temperature of greater than about 1315° C. (about 2400° F.). In some examples, the high-melt powder composition may include an alloy or mixture of alloys with a chemistry that is the similar to or substantially the same (e.g., the same or nearly the same) as the alloy in first component 12A, second component 12B, or both.

The low-melt powder composition and the high-melt powder composition may be combined in any selected ratio. In some examples, the braze material may include a powder mixture consisting of between about 20 wt. % and about 80 wt. % low-melt powder composition and a balance high-melt powder composition (a ratio of between about 1:4 and about 4:1 low-melt powder:high-melt powder). In some cases, braze alloy powder may be a mixture of more than one braze alloy, which are all powder.

In selecting the proportions of components used in the braze material, higher weight percentages of high-melt powder may provide better mechanical properties in view of their reduced levels of boron, silicon, or both. Conversely, higher percentages of low-melt powders may provide improved braze flow. A proper balance between mechanical properties and braze flow should be selected, for example, to promote flow of the braze material to ultimately at least partially conform to joint region 42, while yet retaining sufficient strength or rigidity to mechanically secure components 32A and 32B relative to each other. The at least softened material may flow, migrate, or otherwise at least partially occupy joint region 42, and on cooling, form a mechanical interlock in joint region 42.

Thus, the braze material can be introduced into joint region 42 with the plurality of solid retainer modules 44 with the ability to change shape or "morph" when heated from a pliable or ductile green state into a state that further softens and has the ability to substantially conform to the shape of joint region 42 or a cavity or channel in which the braze material is placed and the plurality of solid retainer modules 44. Such deforming of the braze material may be accomplished at a temperature well below the melting point of components 32A or 32B, for example, without the braze material itself melting into a full liquid state (in contrast with bi-casting, which may require a liquid molten state). However, in other examples, while the braze material may be molten or heated to a liquid state, the plurality of solid retainer modules 44 and components 32A or 32B themselves may be maintained in a solid state, retaining the integrity of the plurality of solid retainer modules 44 and components 32A and 32B. In some examples, as described elsewhere in the disclosure, the braze material may be formed into multiple sections placed adjacent to each other in joint region 22. In such a configuration, the multiple sections will securely bond and fuse to each other during a high temperature furnace operation.

In some examples, the melting characteristics of the braze material may change in response to high temperature exposure. For example, the braze material may include a relatively small percentage of a low melting component, for example, brazing powder, and a relatively higher percentage of a high melting component, for example, superalloy. The low melting component may include an alloy additive that depresses the melting point of the low melting component, causing the low melting component to liquefy at this lower temperature, causing the braze material to soften and slip (and unite if more than one strip is used) during the furnace operation. However, the alloy addition that depresses the melting point of the low melting component may diffuse during the furnace operation (or during a post-furnace diffusion heat treatment) into the larger volume of high melting component, for example, superalloy. Such diffusion may raise the re-melt temperature of the mechanical interlock ultimately formed from the braze material, such that composite mechanical interlock 34 (morphed and fused) formed from the braze material transforms into a rigid metallic structure, (for example a "ring") after the furnace operation and when in subsequent use at high temperature operating conditions. Thus, after the completion of the thermal cycle (and after an optional diffusion heat treat cycle) the braze material may transform into an integrally shaped and consolidated mechanical interlock (in some examples, a "ring") trapped in cavities or channels bridging between components 32A and 32B. The mechanical interlock formed from the braze material may thus function as a high strength, high temperature capable (closely conforming) structural member with material properties similar to a high temperature superalloy, for example, superalloy constituent(s) used in the formulation of the braze material.

Figure 2C:
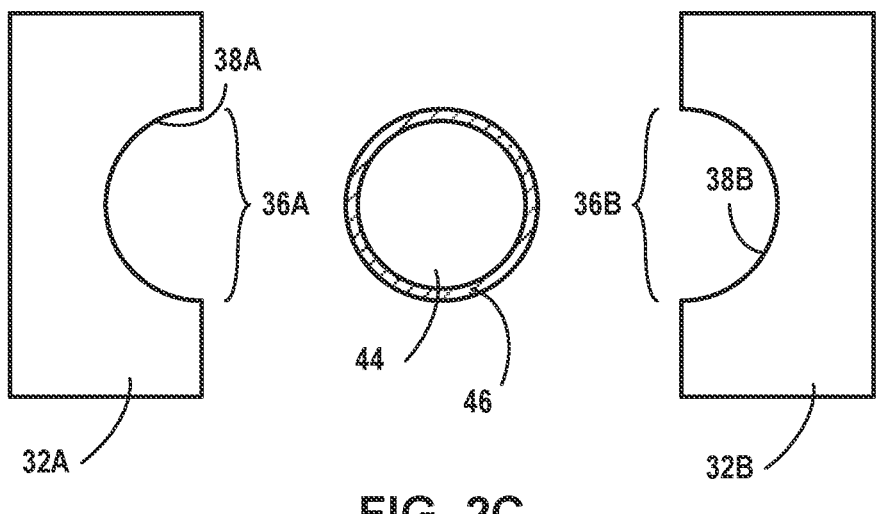
FIG. 2C is a conceptual and schematic diagram illustrating a partial sectional and exploded view of region A of the system of FIG. 2B.

FIG. 2C is a conceptual and schematic diagram illustrating a partial sectional and exploded view of region A of the system of FIG. 2B. In some examples, one or both first joint surface 38A or second joint surface 38B may include an adhesion resistant coating. The adhesion resistant coating may resist adherence or metallurgical bonding of the mechanical interlock formed from the brazing material to surfaces of joint region 42. A joint surface defined by joint region 42, for example, a surface of one or both of first or second joining regions 36A or 36B, may be coated with an adhesion resistant coating. For example, one or both of joint surfaces 38A or 38B of joint region 42 may be respectively coated with the adhesion resistant coating. At least a portion of the adhesion resistant coating may act as a leave-in-place "stop-off", substantially preventing the braze material (or the at least softened material formed by heating the braze material, or the composite mechanical interlock 34 formed by cooling the at least softened material) from adhering to surfaces defined by joint region 42, for example, joint surfaces 38A and 38B. In some examples, the adhesion resistant coating present before, during, and after forming mechanical interlock 34 avoids or substantially prevents introducing a gap (as contrasted with a stop-off removed after application). Thus, the adhesion resistant coating may result in a line-on-line fit or connection between components 32A and 32B and composite mechanical interlock 34 ultimately formed from the braze material and the plurality of solid retainer modules 44, without allowing the braze material to form a metallurgical bond or braze joint with components 32A and 32B.

Further discussion of materials and techniques for a braze material and an adhesion resistant coating may be described in U.S. Patent Application Publication No. 2019/0275617 entitled "Techniques and Assemblies for Joining Components" and filed on Mar. 6, 2019, which is incorporated by reference herein in its entirety.

Figure 3A:
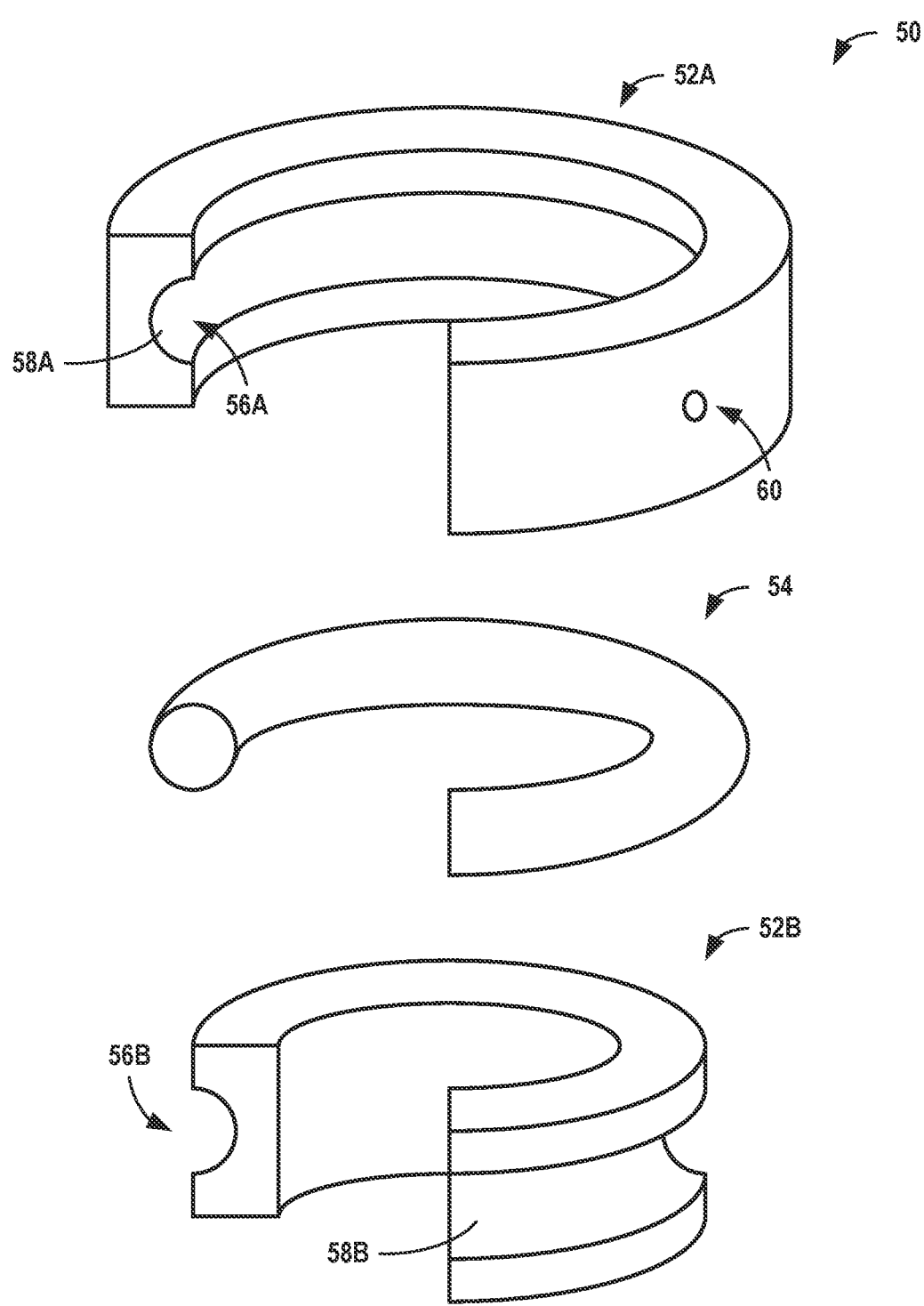
FIG. 3A is a conceptual and schematic diagram illustrating an exploded view of an example assembly for joining a first component and a second component by using a sintered solid retainer material to form a composite mechanical interlock.

In some examples, a monolithic mechanical interlock securing two or more components may be formed from a sintered solid retainer material without melting the solid retainer material. FIG. 3A is a conceptual and schematic diagram illustrating an exploded view of an example assembly 50 for joining a first component 52A and a second component 52B by inserting a solid retainer material and a binder into a joint region 62 to form a monolithic mechanical interlock 54. Unless otherwise specified, first component 52A, second component 52B, a first joining region 56A, a second joining region 56B, a first joint surface 58A, a second joint surface 58B, and joint region 62 may correspond to first component 12A, second component 12B, first joining region 16A, second joining region 16B, first joint surface 18A, second joint surface 18B, and joint region 22 of FIGS. 1A-1C. In the example of FIG. 3A, first component 52A includes an opening 60 that is smaller than opening 20 of FIG. 1A. For example, rather than inserting solid retainer modules, such as the plurality of solid retainer module 24 of FIGS. 1A-1C, mechanical interlock 54 may be formed from solid retainer particles using injection molding, as will be described further below. As such, opening 60 may have a smaller size than opening 20 of FIG. 1A, as opening 60 does not have to accommodate the relatively larger solid retainer modules of the plurality of solid retainer modules 24.

Figure 3B:
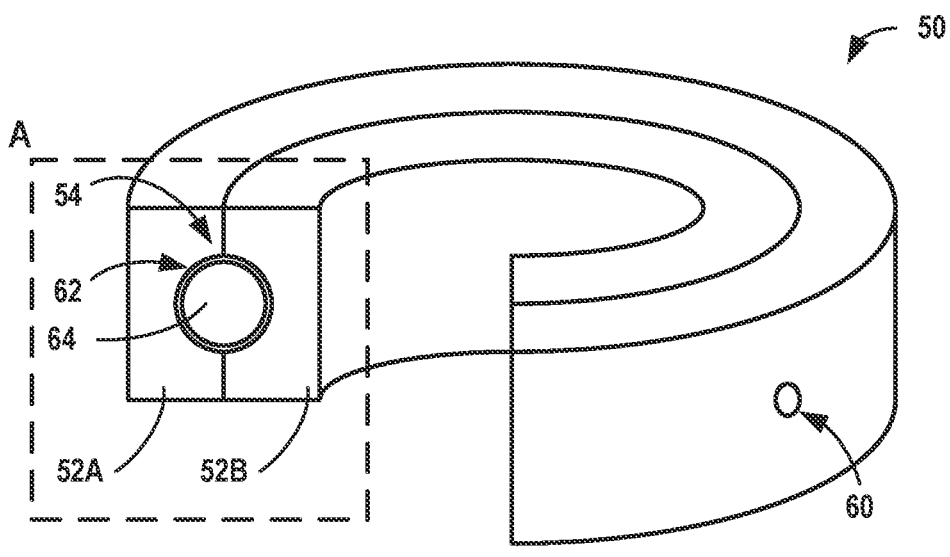
FIG. 3B is a conceptual and schematic diagram illustrating a partial view of an example system including the assembly of FIG. 3A.

FIG. 3B is a conceptual and schematic diagram illustrating a partial view of an example system including the assembly of FIG. 3A. Monolithic mechanical interlock 54 may be an injection molded mechanical interlock that includes a sintered solid retainer material 64. Monolithic mechanical interlock 54 may have a shape that at least partially conforms to joint region 62. The sintered solid retainer material 64 may correspond to (e.g., have similar compositions and/or microstructural properties as) the solid retainer modules 24 of FIGS. 1A-1C. The sintered solid retainer material 64 may be formed from solid retainer powder, as will be described further in FIGS. 4D and 5C below.

Figure 3C:
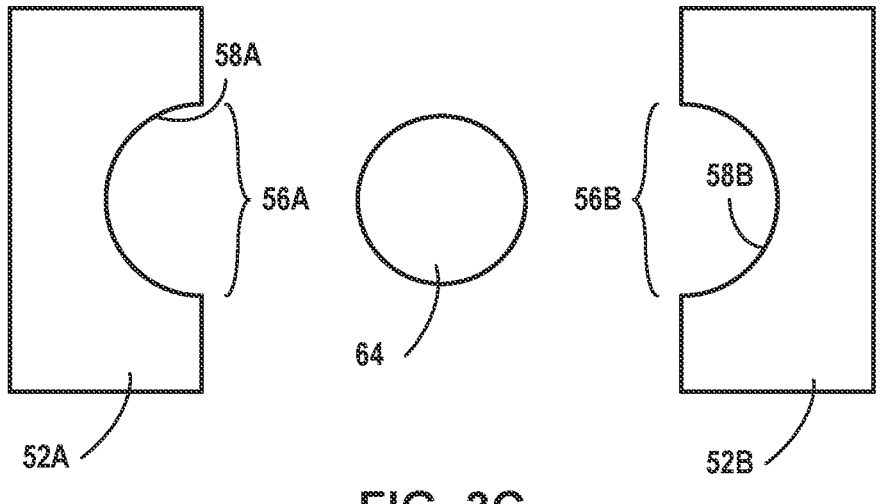
FIG. 3C is a conceptual and schematic diagram illustrating a partial sectional and exploded view of region A of the system of FIG. 3B.

FIG. 3C is a conceptual and schematic diagram illustrating a partial sectional and exploded view of region A of the system of FIG. 3B. In some instances, a diameter of sintered solid retainer material 64 may be substantially the same as a diameter of joint region 62, while in other examples, sintered solid retainer material 64 may be smaller than a diameter of joint region 62, such as in examples in which sintering of a solid retainer material preform formed by debinded solid retainer powder shrinks in one or more dimensions to form a denser sintered solid retainer material 64 having a reduced size in at least one dimension.

Figure 4A:
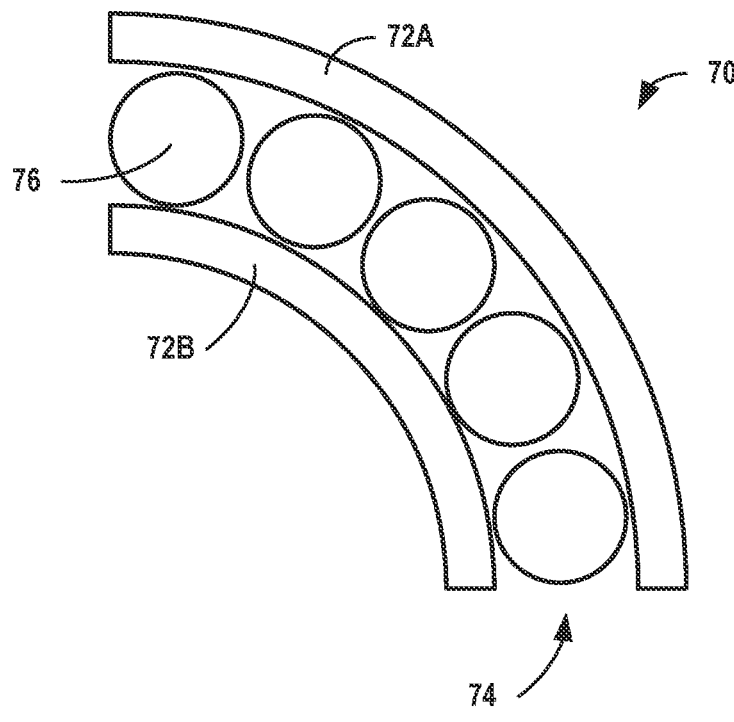
FIG. 4A is a conceptual and schematic diagram illustrating a cross-sectional top view of an example assembly for joining a first component and a second component by inserting generically shaped solid retainer modules to form a mechanical interlock.

In some examples, mechanical interlocks discussed herein may be formed from a plurality of solid retainer modules having relatively simple geometries. For example, a joint region for various components may have a relatively standard, consistent, and/or symmetrical size, such that a plurality of solid retainer modules having a relatively standard or uniform size or shape may be used to form the mechanical interlock. FIG. 4A is a conceptual and schematic diagram illustrating a cross-sectional top view of an example assembly 70 for joining a first component 72A and a second component 72B by inserting generically shaped solid retainer modules 76 into a joint region 74 to form a mechanical interlock. As illustrated in FIG. 4A, each solid retainer module 76 of the plurality of solid retainer modules 76 has a spherical shape with a diameter slightly smaller than a dimension of joint region 74 between first component 72A and second component 72B. Such simple geometries of the plurality of solid retainer modules 76 may fit a wide variety of joint region shapes.

Figure 4B:
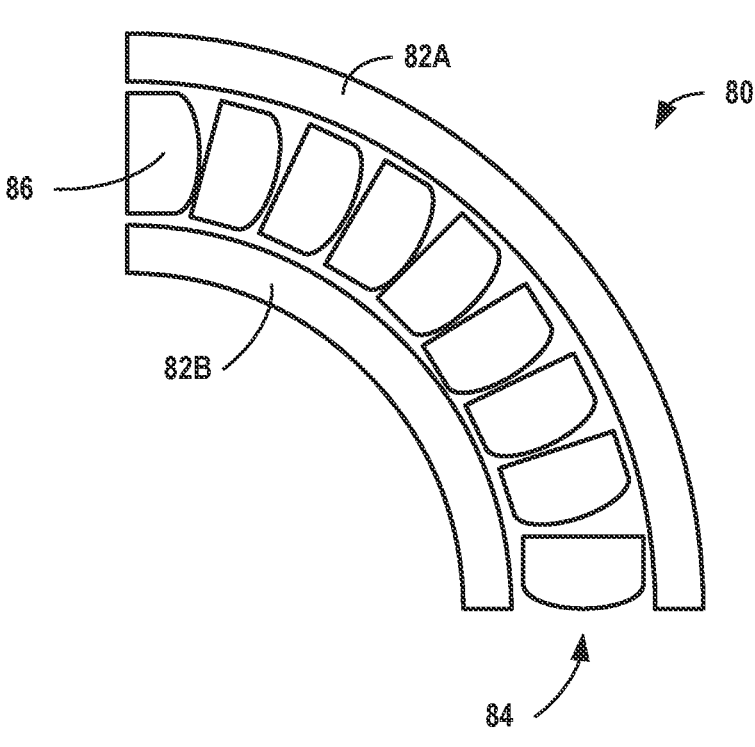
FIG. 4B is a conceptual and schematic diagram illustrating a cross-sectional top view of an example assembly for joining a first component and a second component by inserting specifically shaped solid retainer modules to form a mechanical interlock.

In some examples, mechanical interlocks discussed herein may be formed from relatively complex geometries. For example, a joint region may have a relative complex, unique, and/or asymmetrical shape, such that a plurality of solid retainer modules having a relatively unique shape may be used to form the mechanical interlock. FIG. 4B is a conceptual and schematic diagram illustrating a cross-sectional top view of an example assembly 80 for joining a first component 82A and a second component 82B by inserting specifically shaped solid retainer modules 86 into a joint region 84 to form a mechanical interlock. As illustrated in FIG. 4B, each solid retainer module 86 of the plurality of solid retainer modules 86 has a domed cylindrical shape with a diameter slightly smaller than a dimension of joint region 84 between first component 82A and second component 82B. The cylindrical shape of each solid retainer module 86 may increase a volume of solid retainer material in joint region 84 as compared to, for example, a spherical shape, while the domed shape of each solid retainer module 86 may enable the solid retainer module 86 to advance more easily through joint region 84 as compared to, for example, a strictly cylindrical shape. Such complex geometries of the plurality of solid retainer modules 86, alone or in combination with a shape of joint region 84, may provide enhanced strength compared to shapes of solid retainer modules that are not as specific to a shape of the joint region.

Figure 4C:
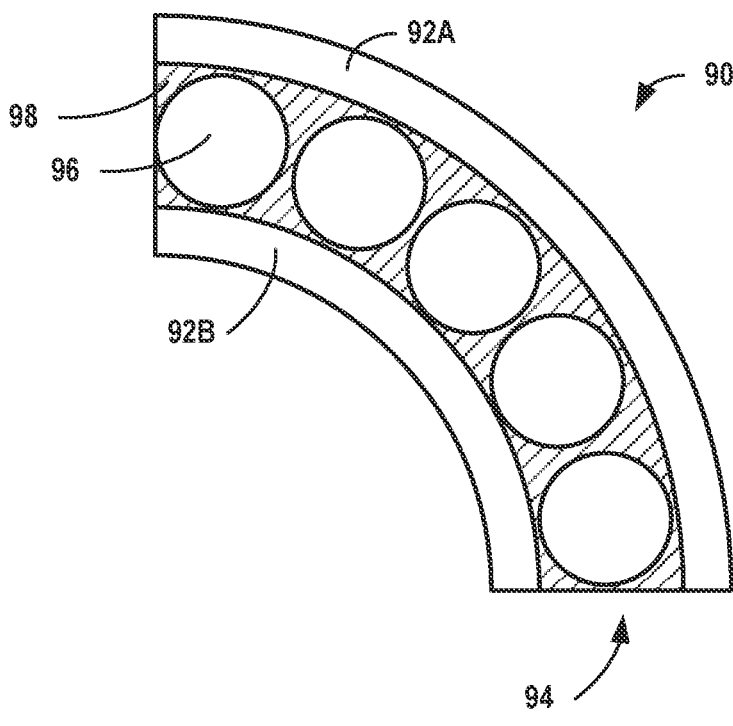
FIG. 4C is a conceptual and schematic diagram illustrating a cross-sectional top view of an example assembly for joining a first component and a second component by inserting solid retainer modules and a binder to form a mechanical interlock.

In some examples, mechanical interlocks discussed herein may be composite mechanical interlocks formed from relatively large solid retainer modules and a binder. For example, a joint region for components may form an interface between two environments. A plurality of solid retainer modules, while providing sufficient strength between the components, may permit air to pass through the joint region between the two environments. By including a binder with the plurality of solid retainer modules to form the composite mechanical interlock, the composite mechanical interlock may seal the two environments and/or provide additional support or strength to the composite mechanical interlock. FIG. 4C is a conceptual and schematic diagram illustrating a cross-sectional top view of an example assembly 90 for joining a first component 92A and a second component 92B by inserting a plurality of solid retainer modules 96 and a binder 98 into a joint region 94 to form a composite mechanical interlock. FIG. 4C may illustrate a mechanical interlock prior to curing binder 98. As illustrated in FIG. 4C, each solid retainer module 96 of the plurality of solid retainer modules 96 is at least partially surrounded by binder 98. Binder 98 contacts the plurality of solid retainer modules 96 and, at least prior to solidifying binder 98, one or more surfaces of components 92A and 92B corresponding to joint region 94. Once cured, binder 98 and the plurality of solid retainer modules 96 may form the composite mechanical interlock, such as composite mechanical interlock 34 of FIGS. 2A-2C. Such composite mechanical interlocks may provide a seal to joint region 94, as binder 98 may fill in voids that previously provided a path for fluids to pass between components 92.

Figure 4D:
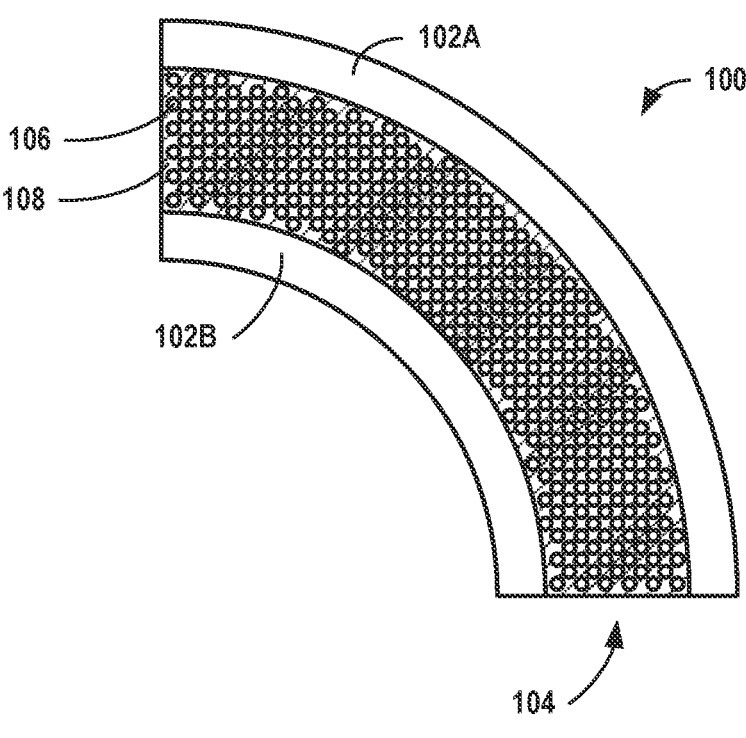
FIG. 4D is a conceptual and schematic diagram illustrating a cross-sectional top view of an example assembly for joining a first component and a second component by inserting injection mold having solid particles to form a mechanical interlock.

In some examples, mechanical interlocks discussed herein may be monolithic mechanical interlocks formed from relatively small (e.g., powders) solid retainer particles and a binder. For example, solid retainer powders may have advantageous properties, such as high strength, that may be integrated into a mechanical interlock without exposing the solid retainer powders to high temperatures associated with a melting point of the solid retainer powders. FIG. 4D is a conceptual and schematic diagram illustrating a cross-sectional top view of an example assembly 100 for joining a first component 102A and a second component 102B by inserting binder 108 having solid retainer particles 106 into a joint region 104 to form a mechanical interlock. FIG. 4D may illustrate joint region 104 prior to debinding binder 108 and sintering solid retainer particles 106, such that the mechanical interlock is not yet formed. As illustrated in FIG. 4D, solid retainer particles 106 are surrounded by binder 108 and distributed throughout the joint region. Once binder 108 has been debinded and the solid retainer particles 106 sintered, the solid retainer particles 106 may form a monolithic mechanical interlock that includes solid retainer material distributed throughout joint region 104. For example, the solid retainer particles 106 may form a continuous phase through joint region 104.

Solid retainer particles 106 may have a variety of shapes including, but not limited to, spheres, random-shapes, blocks, and the like. Solid retainer particles 106 may have a variety of sizes including, but not limited to, about 1 micrometer to about 1 millimeter, such as about 10 micrometers to about 100 micrometers. Solid retainer particles 106 may have a variety of distributions (e.g., a ratio between solid particles 106 to binder 108) including, but not limited to, about 4:1 to about 20:1. For example, the distribution of solid retainer particles 106 may be related to a desired viscosity and/or stability of solid retainer particles 106 and binder 108. In some examples, solid retainer particles 106 may have a composition similar to the plurality of solid retainer modules 24 and 44 discussed in FIGS. 1B and 1C and FIGS. 2B and 2C, respectively.

Binder 108 may be selected to hold solid retainer particles 106 together and/or provide solid retainer particles 106 with fluidity, such that solid retainer particles 106 may be relatively evenly distributed in the joint region. Binder 108 may include a filler and a structural polymer. A variety of metal or ceramic injection binders 108 may be used including, but not limited to: polymer-based binders, such as polyacetal, polyamide, or methyl cellulose fillers and polyethylene, polybutene, poly(ethylene-co-vinyl acetate), polystyrene, poly(methyl methacrylate), poly(ethylene glycol), or poly (vinyl acetate) structural polymers; wax-based binders, such as paraffin-based wax, microcrystalline wax, synthetic hydrocarbon wax, or oxidized polyethylene wax fillers and polyethylene, polybutene, poly(ethylene-co-vinyl acetate), polystyrene, poly(methyl methacrylate), poly(ethylene glycol), or poly(vinyl acetate) structural polymers; combinations of waxes and polymers, and the like. In some examples, binder 108 may be selected to be a powder at ambient temperature and a liquid at relatively low processing temperatures, such as temperatures lower than a melting point of solid retainer particles 106. In some examples, binder 108 may include additives, such as dispersants (e.g., to increase wettability of solid retainer particles 106), stabilizers (e.g., to reduce agglomeration of solid retainer particles 106), plasticizers (e.g., to increase flow of solid retainer particles 106 and/or binder 108), lubricants (e.g., to reduce interaction between solid retainer particles 106 and binder 108), and the like.

Figure 5A:
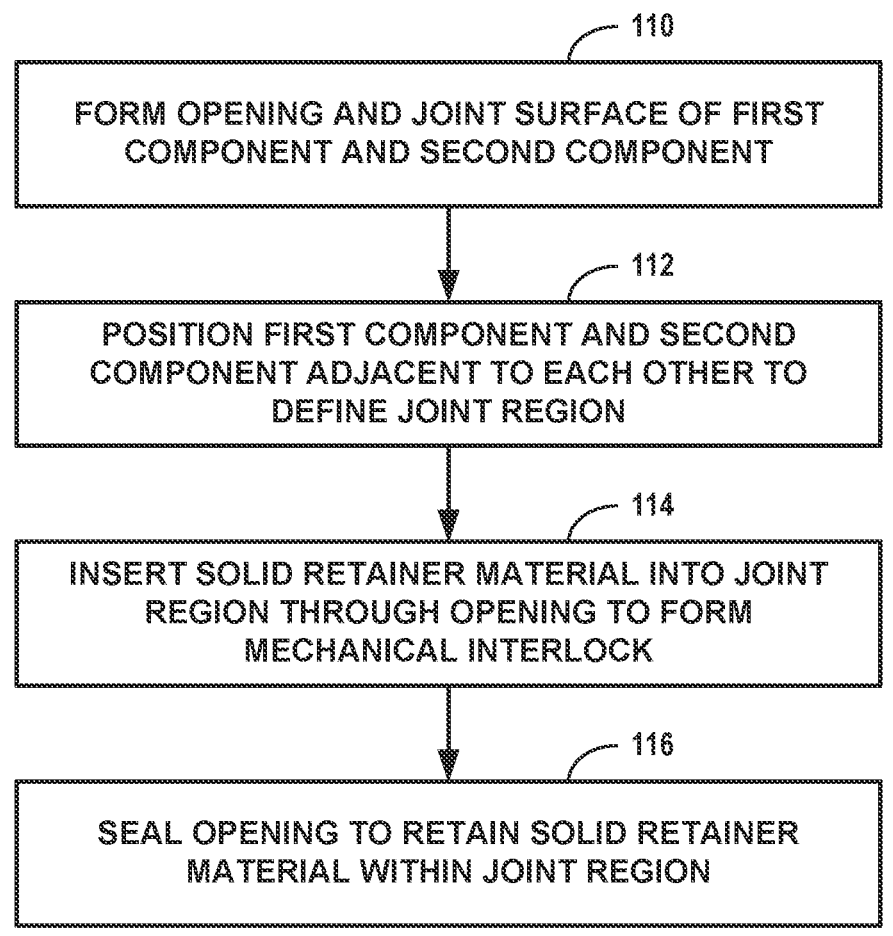
FIG. 5A is a flow diagram illustrating an example technique for forming a mechanical interlock using solid retainer modules to join components.

FIG. 5A is a flow diagram illustrating an example technique for forming a mechanical interlock using a solid retainer material to join components. The technique of FIG. 5A will be described with reference to assembly 10 of FIGS. 1A-1C for purposes of illustration only. It will be appreciated that the technique of FIG. 5A may be performed with a different assembly or system, or that assembly 10 may be used in a different joining technique.

The technique of FIG. 5A may optionally include forming opening 20 and/or joint surfaces 18A and 18B of first component 12A and second component 12B, respectively (110). As described elsewhere in the disclosure, the geometry of joint region 22 may depend on the type of joint defined by joint surfaces 18A and 18B and may include, for example, a bridle joint, a butt joint, a scarf joint, a miter join, a dado joint, a groove joint, a tongue and groove joint, a mortise and tenon joint, a birdsmouth joint, a halved joint, a biscuit joint, a lap joint, a double lap joint, a dovetail joint, or a splice joint.

Although not shown in FIG. 5A, in some examples, joint surfaces 18A and 18B of components 12A and 12B, respectively, may be inspected and cleaned, for example, before the positioning (112). The cleaned joint surfaces 18A and 18B may produce a more uniform joint than uncleaned joint surfaces. The technique of FIG. 5A includes positioning components 12A and 12B to define joint region 22 (112). For example, as shown in FIGS. 1B and 1C, components 12A and 12B may be positioned so that joining regions 16A and 16B are near each other.

The technique of FIG. 5A also includes inserting a solid retainer material into joint region 22 through opening 20 to form mechanical interlock 14 (114). The solid retainer material may include a plurality of solid retainer modules 24. The plurality of solid retainer modules 24 may be inserted in joint region 22 such that the plurality of solid retainer modules 24 form mechanical interlock 14 between first component 12A and second component 12B. The technique of FIG. 5A includes sealing opening 20 to retain the plurality of solid retainer modules 24 within joint region 22 (116). For example, opening 20 may be brazed or welded to prevent the plurality of solid retainer modules 24 from passing through opening 20.

Thus, the example technique of FIG. 5A may be used to form mechanical interlock 14 between components 12A and 12B from the plurality of solid retainer modules 24 in assembly 10 of FIGS. 1A-1C, without melting the mechanical retainer material. Although FIG. 1A illustrates a simplified conceptual and schematic view of an example first component 12A, an example second component 12B, and an example mechanical interlock 14, in other examples, example assemblies may include components and a mechanical interlock defining a more complication geometry.

Figure 5B:
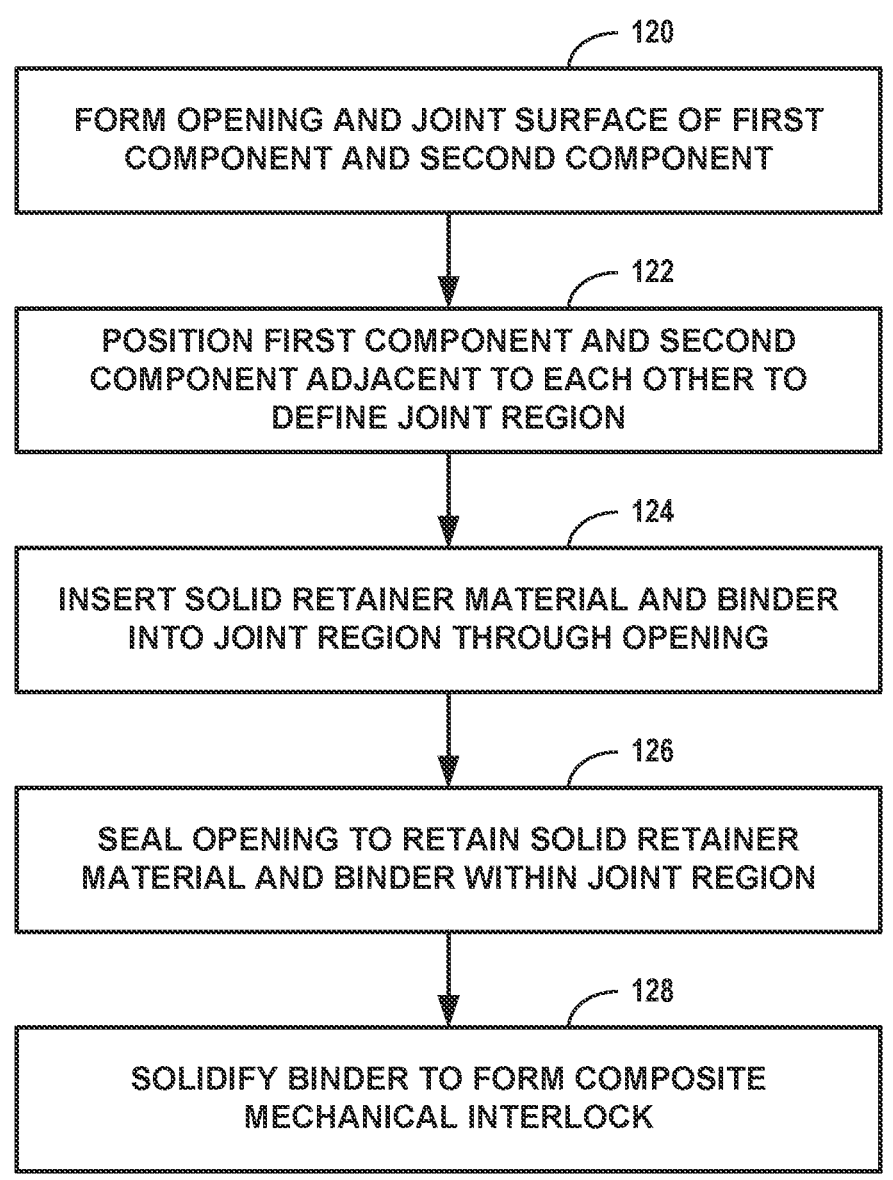
FIG. 5B is a flow diagram illustrating an example technique for forming a composite mechanical interlock using solid retainer modules and a binder to join components.

FIG. 5B is a flow diagram illustrating an example technique for forming a composite mechanical interlock using a solid retainer material to join components. The technique of FIG. 5B will be described with reference to assembly 30 of FIGS. 2A-2C for purposes of illustration only. It will be appreciated that the technique of FIG. 5B may be performed with a different assembly or system, or that assembly 30 may be used in a different joining technique. As described in FIG. 5A above, the technique of FIG. 5B may optionally include forming opening 40 and/or joint surfaces 38A and 38B of first component 32A and second component 32B, respectively (120), and positioning components 32A and 32B to define joint region 42 (122).

In some examples, such as examples in which composite mechanical interlock 34 includes a braze material, the example technique of FIG. 5B includes optionally coating a joint surface of joint region 42 defined by first and second components 32A and 32B with an adhesion resistant coating (not shown). The coating technique may include physical vapor deposition, chemical vapor deposition, plasma deposition, spraying, deposition of a liquid, marker, or putty, atmospheric exposure at high temperatures, or any other suitable coating technique. In some examples, the example technique may not include the coating step, and instead, pre-coated components 32A and 32B may be used.

The technique of FIG. 5B includes inserting a solid retainer material, such as the plurality of solid retainer modules 44, and binder 46 into joint region 42 through opening 40 (124). Binder 46 may be disposed in joint region 42 such that binder 46 contacts respective joint surfaces of joint region 42, for example, joint surfaces 38A and 38B. In some examples, a clamp, press, or other mechanism may be used to compress the braze material between joining regions 36A and 36B to cause intimate contact between joint surfaces 38A and 38B and surfaces of binder 46 and, correspondingly, composite mechanical interlock 34, although intimate contact between joint surfaces 38A and 38B and surfaces of composite mechanical interlock 34 is not required. As described in FIG. 5B, the technique of FIG. 5A includes sealing opening 20 to retain the plurality of solid retainer modules 24 within joint region 22 (126).

The technique of FIG. 5B includes solidifying binder 46 around the plurality of solid retainer modules 44 to form composite mechanical interlock 34 (128). For example, such as examples in which binder 46 is a braze material, the braze material may be melted and solidified around the plurality of solid retainer modules 44 to form composite mechanical interlock 34.

Thus, the example technique of FIG. 2 may be used to form a mechanical interlock between components 32A and 32B from the plurality of solid retainer modules 44 and binder 46 in assembly 10 of FIGS. 2A-2C, without melting the mechanical retainer material. Although FIGS. 2A-2C illustrate a simplified conceptual and schematic view of an example first component 32A, an example second component 32B, and an example composite mechanical interlock 34, in other examples, example assemblies may include components and a mechanical interlock defining a more complicated geometry.

Figure 5C:
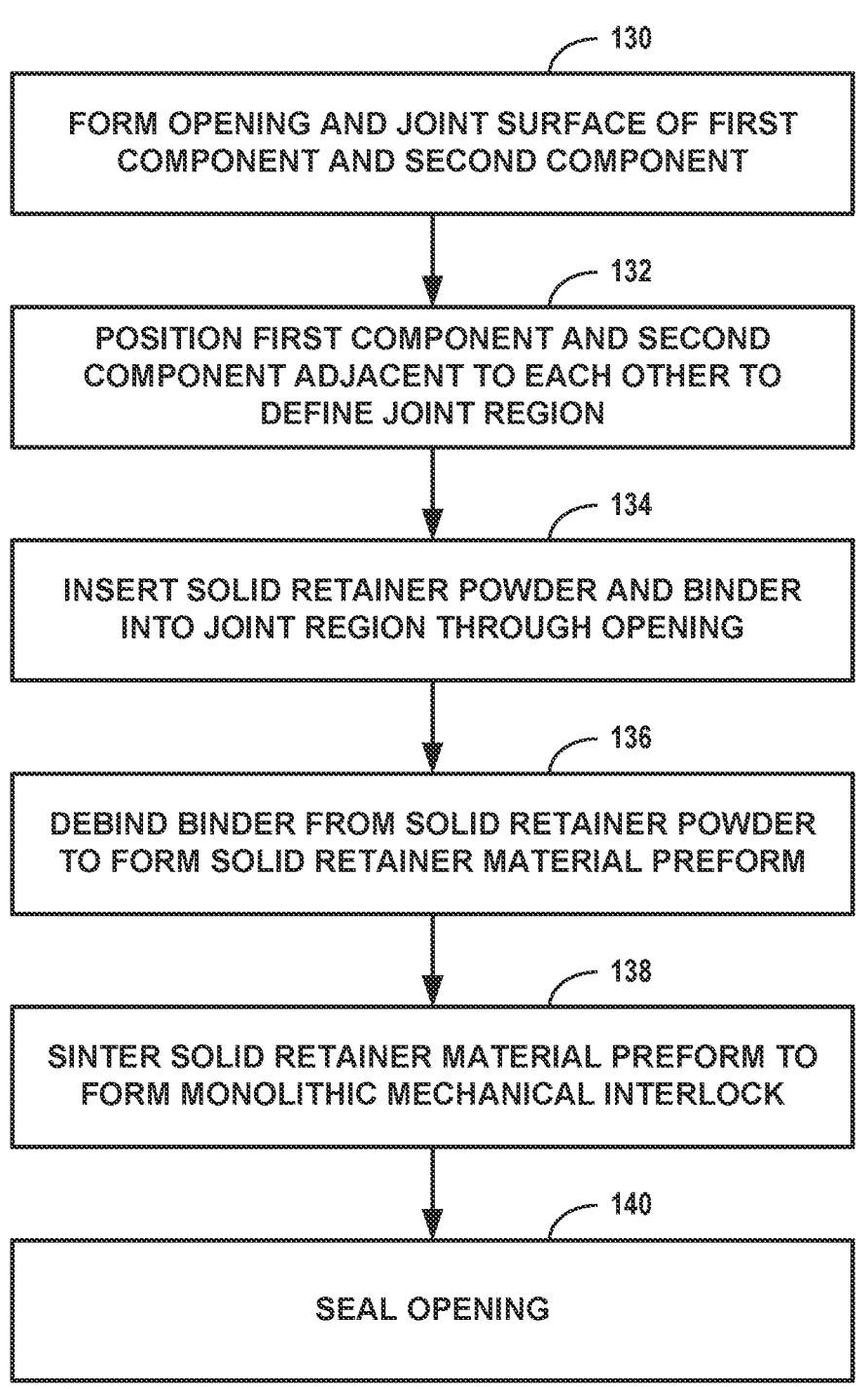
FIG. 5C is a flow diagram illustrating an example technique for forming a monolithic mechanical interlock using a sintered solid retainer material to join components.

FIG. 5C is a flow diagram illustrating an example technique for joining components including inserting a solid material. The technique of FIG. 5C will be described with reference to assembly 50 of FIGS. 3A-3C and assembly 100 of FIG. 4D for purposes of illustration only. It will be appreciated that the technique of FIG. 5C may be performed with a different assembly or system, or that assembly 50 or assembly 100 may be used in a different joining technique. As described in FIG. 5A above, the technique of FIG. 5C may optionally include forming opening 60 and/or joint surfaces 58A and 58B of first component 52A and second component 52B, respectively (130), and positioning components 52A and 52B to define joint region 62 (132).

The technique of FIG. 5C includes inserting a solid retainer powder (e.g., solid retainer particles 106) and a binder (e.g., binder 108) into joint region 104 through an opening (134). For example, as illustrated in FIG. 4D, solid retainer particles 106 may be dispersed in binder 108, such that the mixture of solid retainer particles 106 and binder 108 may be injected through an opening into joint region 104. The mixture of solid retainer particles 106 and binder 108 may be injected using any suitable metal injection molding and/or ceramic injection molding techniques. For example, binder 108 may be heated prior or subsequent to injection of solid retainer particles 106 and binder 108 to flow solid retainer particles 106 and binder 108 through the joint region.

The technique of FIG. 5C includes debinding binder 108 from solid retainer particles 106 to form a solid retainer material preform (136). For example, depending on binder 108, debinding may involve any of thermal debinding (e.g., heating binder 108 to decompose binder 108 and remove binder 108 using gases), solvent debinding (e.g., contacting binder 108 with a solvent to dissolve binder 108 and remove the dissolved binder 108), and/or catalytic debinding (e.g., contacting binder 108 with a gaseous catalyst to decompose binder 108 and remove binder 108 using gases).

The technique of FIG. 5C include sintering the solid retainer material preform to form monolithic mechanical interlock 54 (138). For example, assembly 100 may be placed into a furnace and heated to a sintering temperature configured to joint solid retainer particles 106 to form monolithic mechanical interlock 54 of FIGS. 3A-3C. The sintering temperature of solid retainer particles 106 may be lower than a melting temperature of solid retainer particles 106.

As described in FIG. 5A, the technique of FIG. 5C includes sealing opening 60 (140). While sealing the opening is illustrated as being performed after the solid retainer particles are sintered, in some instances, the opening may be sealed prior to solid retainer particles 106 being sintered, such as after binder 108 has been removed.

Various examples have been described. These and other examples are within the scope of the following claims.

What is claimed is:

1. An assembly comprising:
a first component defining a first channel;
a second component defining a second channel opposing the first channel, wherein the first component and the second component are positioned adjacent to each other to define a joint region between adjacent portions of the first component and the second component; and
a mechanical interlock comprising a solid retainer material disposed in the joint region, wherein the solid retainer material comprises at least one of a metal, a metal alloy, or a ceramic,
wherein the mechanical interlock is isolated in the joint region and extends at least partially into the first channel and into the second channel, and
wherein the mechanical interlock mechanically secures the first component relative to the second component.

2. The assembly of claim 1, wherein the first component and the second component completely surround the mechanical interlock.

3. The assembly of claim 1, wherein the solid retainer material comprises a plurality of solid retainer modules.

4. The assembly of claim 3, wherein each solid retainer module of the plurality of solid retainer modules at least partially conforms to the joint region.

5. The assembly of claim 3,
wherein the mechanical interlock is a composite mechanical interlock, and
wherein the mechanical interlock further comprises a binder around the solid retainer material to form the composite mechanical interlock.

6. The assembly of claim 5, wherein the binder comprises a braze material having a lower melting point than the solid retainer material.

7. The assembly of claim 1, wherein the mechanical interlock is a monolithic mechanical interlock.

8. The assembly of claim 1, wherein the solid retainer material comprises a Ni-based superalloy, a Co-based superalloy, or a Fe-based superalloy.

9. The assembly of claim 1, wherein the first component and the second component comprise at least one of a metal, a metal alloy, or a ceramic-based material.

10. The assembly of claim 1, wherein the solid retainer material comprises a solid retainer powder, and wherein the solid retainer material is sintered to form the mechanical interlock.

11. The assembly of claim 1, wherein the first channel and the second channel together define a circular periphery.

12. The assembly of claim 1, wherein the first channel mirrors the second channel.

13. The assembly of claim 1, wherein one of the first component or the second component defines a sealed opening connected respectively to the first channel or to the second channel.

14. The assembly of claim 3, wherein at least one solid retainer module of the plurality of solid retainer modules is spherical, cylindrical, barrel-shaped, or ovular.

15. The assembly of claim 1, wherein the mechanical interlock comprises a ring-shaped body.

16. The assembly of claim 1, wherein the joint region is enclosed solely by the first component and the second component.

17. The assembly of claim 1, wherein the joint region is defined solely by the first channel and the second channel.

18. The assembly of claim 1, wherein the first component is mechanically secured relative to the second component solely by the mechanical interlock.

19. The assembly of claim 1, wherein the joint region is solely occupied by the mechanical interlock.

* * * * *